United States Patent [19]

Lings

[11] Patent Number: 4,981,193
[45] Date of Patent: Jan. 1, 1991

[54] ENGINE AND TRANSMISSION ARRANGEMENT FOR FOUR WHEEL DRIVE VEHICLE

[75] Inventor: Geoffrey P. Lings, Allesley, United Kingdom

[73] Assignee: Jaguar Cars Limited, England

[21] Appl. No.: 308,407

[22] Filed: Feb. 9, 1989

[30] Foreign Application Priority Data

Feb. 10, 1988 [GB] United Kingdom ............... 8802981

[51] Int. Cl.⁵ .................... B60K 17/344; F16H 37/06
[52] U.S. Cl. ................................. 180/248; 74/665 H; 180/292
[58] Field of Search ..................... 180/248, 233, 292; 74/665 H, 665 S, 665 T, 665 F, 665 G; 123/55 V

[56] References Cited

U.S. PATENT DOCUMENTS

| | | | |
|---|---|---|---|
| 4,208,923 | 6/1980 | Ikegami | 74/665 G X |
| 4,667,767 | 5/1987 | Shea et al. | 180/248 X |
| 4,690,238 | 9/1987 | von Sivers et al. | 180/248 |
| 4,714,129 | 12/1987 | Mueller | 180/248 |
| 4,729,262 | 3/1988 | Lanzer | 180/248 X |
| 4,779,698 | 10/1988 | Iwata | 74/665 T X |

FOREIGN PATENT DOCUMENTS

| | | | |
|---|---|---|---|
| 803574 | 10/1936 | France. | |
| 2230512 | 12/1974 | France. | |
| 1102901 | 2/1965 | United Kingdom | 180/248 |

*Primary Examiner*—Rodney H. Bonck
*Assistant Examiner*—Khoi Q. Ta
*Attorney, Agent, or Firm*—Davis, Bujold & Streck

[57] ABSTRACT

An engine and transmission arrangement for a four wheel drive vehicle comprises an engine arranged to extend substantially along a longitudinal center line of the vehicle. A gearbox receives power from the engine and a torque splitting device is connected to an output of the gearbox so as to pass part of the power to a rear final drive and part of the power to a front final drive. The front final drive and the rear final drive each includes a drive shaft which extends substantially along the longitudinal center line of the vehicle and at least a part of one of the drive shafts extends above a substantial portion of the engine.

18 Claims, 3 Drawing Sheets

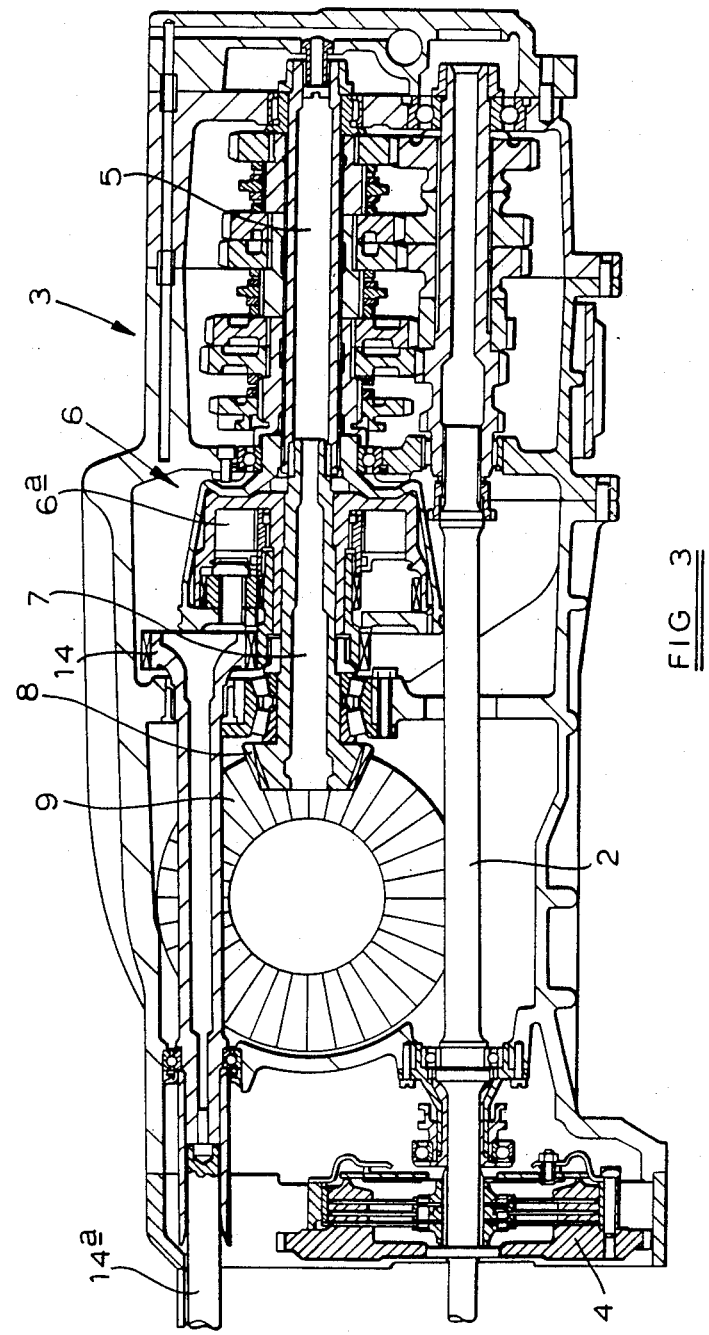
FIG_3

ENGINE AND TRANSMISSION ARRANGEMENT FOR FOUR WHEEL DRIVE VEHICLE

FIELD OF THE INVENTION

The present invention relates to an engine and transmission arrangement for a four wheel drive vehicle.

DESCRIPTION OF PRIOR ART

Four wheel drive vehicles are well known, with power from the engine passing through a gearbox and thence to a torque splitting device so that part of the power is passed to a rear final drive and part of the power is passed to a front final drive. However, problems can be encountered in passing the power around the engine to either the front or rear final drive and this is conventionally overcome by providing a transfer drive to a shaft passing externally alongside the engine, possibly with the engine being offset from the centerline of the vehicle. The transfer drive results in additional weight and power loss in the drive, both of which are undesirable.

OBJECT OF THE INVENTION

It is an object of the present invention to provide an engine and transmission arrangement for a four wheel drive vehicle which overcomes the disadvantages of the known arrangements.

SUMMARY OF THE INVENTION

According to one aspect of the present invention there is provided an engine and transmission arrangement for a four wheel drive vehicle comprising an engine arranged to extend substantially along a longitudinal center line of the vehicle; a gearbox for receiving power from the engine; a torque splitting device connected to an output of the gearbox so as to pass part of the power to a rear final drive and part of the power to a front final drive, wherein the front final drive and the rear final drive each includes a drive shaft which extends substantially along the longitudinal center line and wherein at least a part of one of the drive shafts extends above a substantial portion of the engine.

The engine may comprise a V-configuration with the drive shaft passing through the V of the engine. Alternatively the engine may have a configuration which occupies a small overall height such as a slant in-line configuration or a horizontally opposed configuration.

The torque splitting device is preferably arranged in the region between the gearbox and the engine.

One of the front final drive and the rear final drive is preferably arranged in the region between the torque splitting device and the engine.

The torque splitting device may incorporate a slip controlling mechanism.

The gearbox may be arranged at one longitudinal end of the engine.

According to another aspect of the present invention there is provided a four wheel drive vehicle comprising an engine extending substantially along a longitudinal center line of the vehicle; a gearbox for receiving power from the engine; a torque splitting device connected to an output of the gearbox so as to pass part of the power to a rear final drive and part of the power to a front final drive, wherein the front final drive and the rear final drive each includes a drive shaft which extends substantially along the longitudinal center line and wherein at least a part of one of the drive shafts extends over a substantial portion of the engine.

The engine may comprise a V-configuration with the drive shaft passing through the V of the engine. Alternatively the engine may have a configuration which occupies a small overall height such as a slant in-line configuration or a horizontally opposed configuration.

The torque splitting device is preferably arranged in the region between the gearbox and the engine.

One of the front final drive and the rear final drive is preferably arranged in the region between the torque splitting device and the engine.

The torque splitting device may incorporate a slip controlling mechanism.

The gearbox may be arranged at one longitudinal end of the engine.

The engine may be mounted in the mid portion of the vehicle. The gearbox is preferably provided at the rear of the engine with the drive shaft of the front final drive extending over the engine. Alternatively the engine may be mounted in the front portion of the vehicle.

For a better understanding of the present invention and to show more clearly how it may be carried into effect reference will now be made, by way of example, to the accompanying drawings in which:

BRIEF DESCRIPTION OF THE DRAWINGS

FIG. 3 is a cross-sectional view showing in more detail a gearbox, torque splitting device and rear final drive of the vehicle shown in FIGS. 1 and 2.

DESCRIPTION OF PREFERRED EMBODIMENT

Figure 1:
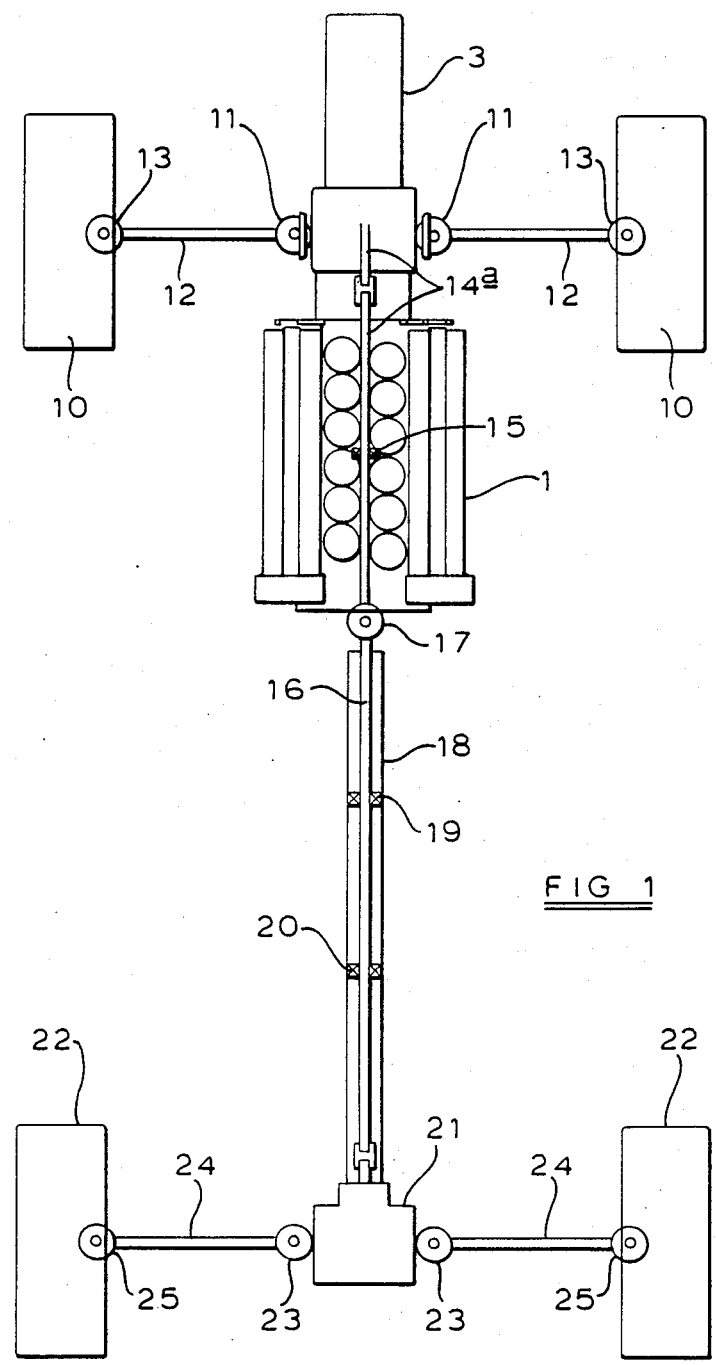
FIG. 1 is a diagrammatic plan view of one embodiment of an engine and transmission arrangement incorporated into a four wheel drive vehicle according to the present invention.
Figure 2:
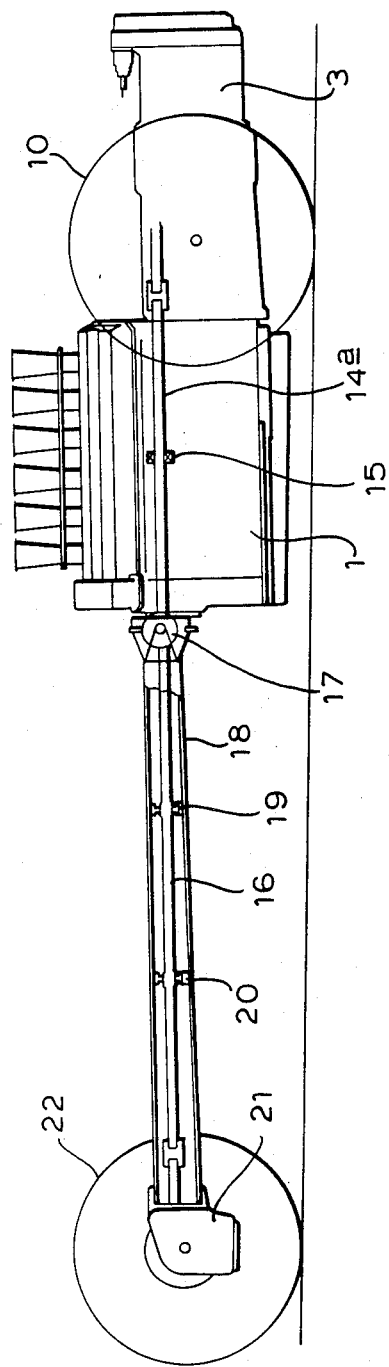
FIG. 2 is a diagrammatic elevational view of the engine and transmission arrangement incorporated into a four wheel drive vehicle shown in FIG. 1.

The figures show a part of a four wheel drive vehicle which incorporates an engine 1, for example of V-configuration, which drives an input shaft 2 of a gearbox 3 by way of a clutch 4. Power passes out of the gearbox 3 by way of an output shaft 5 which is connected to a torque splitting device 6 that is arranged between the gearbox 3 and the engine 1. The torque splitting device incorporates a slip controlling mechanism 6a. There are two outputs from the torque splitting device to a rear final drive and to a front final drive.

The rear final drive comprises a shaft 7 having a pinion 8 formed thereon and driving a crown wheel 9, from whence power is transferred to rear wheels 10 by way of inner universal joints 11, driveshafts 12 and outer universal joints 13.

The front final drive comprises transfer gears 14 and a drive shaft 14a which passes through the V of engine 1, supported by bearing 15 and is connected to drive shaft 16 by way of a universal joint 17. Drive shaft 16 is supported within a tube 18 by way of bearings 19,20 and is connected to a differential 21 which drives front wheels 22 by way of inner universal joints 23, drive shafts 24 and outer universal joints 25.

By passing the drive shaft 14a through the V of engine 1 both the engine and the drive shaft can be located substantially on the longitudinal center line of the vehicle. This improves the construction, weight distribution and handling of the vehicle, reduces power loss by reducing the number of universal joints, transfer gears and bearings and reduces weight by reducing components and fastenings. Vehicle packaging is facilitated, particularly in a passenger car in which the seating is arranged symmetrically about the longitudinal center line of the vehicle.

While the drawings illustrate a mid-engined vehicle, the engine could be a V-configuration engine mounted towards the front of the vehicle, or an engine which occupies a small overall height such as an in-line engine slanted with respect to the vertical so as to permit the drive shaft to pass over a substantial part of the engine along the longitudinal center line of the vehicle while the inclination of the engine allows the center of gravity of the engine also to remain substantially on the longitudinal center line of the vehicle, or a horizontally opposed engine which permits the drive shaft to pass over the engine along the longitudinal center line of the vehicle.

I claim

1. An engine and transmission arrangement for a four wheel drive vehicle comprising:
   an engine arranged to extend substantially along a longitudinal center line of the vehicle;
   a gearbox for receiving power from the engine; and
   a torque splitting device connected to an output of the gearbox so as to pass part of the power to a rear final drive and part of the power to a front final drive, wherein the front final drive and the rear final drive each includes a drive shaft which extends substantially along the longitudinal center line, and wherein at least a part of one of the drive shafts extends superjacent a portion of the engine.

2. An arrangement according to claim 1, wherein the engine comprises a V-configuration with the drive shaft passing through the V of the engine.

3. An arrangement according to claim 1, wherein the torque splitting device is arranged in the region between the gearbox and the engine.

4. An arrangement according to claim 3, wherein one of the front final drive and the rear final drive incorporates a differential which is arranged in the region between the torque splitting device and the engine.

5. An arrangement according to claim 1, wherein the torque splitting device incorporates a slip controlling mechanism.

6. An arrangement according to claim 1, wherein the gearbox is arranged at one longitudinal end of the engine.

7. A four wheel drive vehicle comprising:
   an engine, having an output, extending substantially along a longitudinal center line of the vehicle;
   a gearbox for receiving power from the engine; and
   a torque splitting device connected to an output of the gearbox so as to pass part of the power to a rear final drive and part of the power to a front final drive, wherein the front final drive and the rear final drive each includes a drive shaft which extends substantially along the longitudinal center line, and wherein at least a part of one of the drive shafts extends superjacent at least the output of the engine.

8. A vehicle according to claim 7, wherein the engine comprises a V-configuration with the drive shaft passing through the V of the engine.

9. A vehicle according to claim 7, wherein the torque splitting device is arranged in the region between the gearbox and the engine.

10. A vehicle according to claim 9, wherein one of the front final drive and the rear final drive incorporates a differential which is arranged in the region between the torque splitting device and the engine.

11. An vehicle according to claim 7, wherein the torque splitting device incorporates a slip controlling mechanism.

12. An arrangement according to claim 7, wherein the gearbox is arranged at one longitudinal end of the engine.

13. A vehicle according to claim 7, wherein the engine is mounted in the mid portion of the vehicle.

14. A vehicle according to claim 13, wherein the gearbox is provided at the rear of the engine with the drive shaft of the front final drive extending over the engine.

15. A vehicle according to claim 7, wherein the engine is mounted in the front portion of the vehicle.

16. An engine and transmission arrangement for a four wheel drive vehicle comprising:
    a V-configuration engine arranged to extend substantially along a longitudinal center line of the vehicle;
    a gearbox for receiving power from the engine; and a torque splitting device connected to an output of the gearbox so as to pass part of the power to a rear final drive and part of the power to a front final drive, wherein the front final drive and the rear final drive each includes a drive shaft which extends substantially along the longitudinal center line, and wherein at least a part of one of the drive shafts passes through the V of the engine.

17. A four wheel drive vehicle comprising:
    a V-configuration engine extending substantially along a longitudinal center line of the vehicle;
    a gearbox for receiving power from the engine; and
    a torque splitting device connected to an output of the gearbox so as to pass part of the power to a rear final drive and part of the power to a front final drive, wherein the front final drive and the rear final drive each includes a drive shaft which extends substantially along the longitudinal center line, and wherein at least a part of one of the drive shafts passes through the V of the engine.

18. A four wheel drive vehicle comprising:
    an engine, having an output mounted in the mid portion of the vehicle and extending substantially along a longitudinal center line of the vehicle;
    a gear box for receiving power from the engine, the gearbox being positioned at the rear of the engine; and
    a torque splitting device connected to an output of the gear box so as to pass part of the power to a rear final drive and part of the power to a front final drive each includes a drive shaft which extends substantially along the longitudinal center line, and wherein the drive shaft of the front final drive extends superjacent at least the output of the engine.

* * * * *